Figure 1:
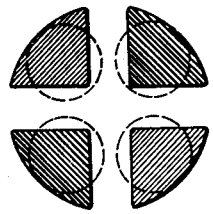

March 5, 1935.                    W. RIHL                    1,993,526

SUBMARINE COMMUNICATION CABLE

Filed Feb. 18, 1930

INVENTOR
WILHELM RIHL
BY
ATTORNEYS.

Patented Mar. 5, 1935

1,993,526

UNITED STATES PATENT OFFICE 1,993,526

SUBMARINE COMMUNICATION CABLE

Wilhelm Rihl, Berlin-Eichkamp, Germany, assignor to Siemens & Halske, Aktiengesellschaft, Siemensstadt, near Berlin, Germany, a corporation of Germany Application February 18, 1930, Serial No. 429,355
In Germany May 10, 1929

1 Claim. (Cl. 173—266)

The invention relates to submarine communication (telephone or telegraph) cables, in particular for deep-sea and long distances (transoceanic cables).

The development of deep-sea communication cables for transmission over great distances makes new demands on cable engineering which are connected with the great cable lengths and the high hydraulic pressure to which the cables are subjected when laid. In order to be able, according to a suggestion made, to use paper insulated cables with lead sheaths in such cases use should be made of pressure protecting devices of light metals which surround the cable core and intercept the hydraulic pressure. This protection against pressure which, for example, may be carried out by strong, shaped wires surrounding the cable core, is enclosed in a water-tight lead sheath which is fitted with a heavy armouring. Of course, the use of this pressure protecting device enhances the price of the cable as these protective devices must be made all the more heavy the greater the diameter of the cable core is, i. e. to a larger extent than proportionally to the cross-section of the cable core. Since such a deep-sea cable represents a great value comparatively small differences in cost for the unit length play an important part. For economical reasons and for the purpose of reducing the weight and increasing the flexibility of the cable, it is therefore desirable to make the cable section as small as possible.

With these known deep-sea cables for great distances considerable conductor diameters, with thin insulation as compared with the normal cables, must partly be taken into account.

According to the present invention, in the case of submarine communication cables for long distances, with a given capacity, a reduction of the section of the cable core and thus of the protecting device, armouring and the like, as compared with the known cables having conductors with circular cross-sections, is obtained by the conductors being given a shape which is extremely suitable to save room in the cable core.

Submarine communication cables, more particularly telephone cables whose repeater sections are very long (under certain conditions as long as 2000 km. and more, for instance, with a transatlantic Europe-Azores-America cable), result even with the maximum attenuations, at present theoretically permissible for repeater sections, in conductor diameters, for which the use of a sectional area differing from the usual circular sectional area is recommendable. By a suitably chosen profile of the conductors, the cable section can be reduced and built up more symmetrically and more stable, without appreciably increasing the mutual capacity. The most suitable conductor profiles which involve the reduction of the section always depend on the structure of the cable, i. e. on the number of conductors included in it.

Figure 2:
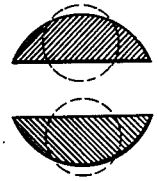
Figure 3:
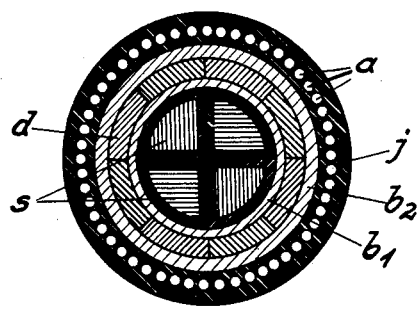

According to the invention, the conductors in a cable with pair formation, for instance, will be given a segment shaped or approximately semi-circular cross-section (Figure 2 of the accompanying drawing) whereas, in a cable with star quad formation, the conductors are made approximately sector-shaped (Figures 1 and 3 of the accompanying drawing).

From Fig. 1 it will be seen that by the selection of a, say, sector-shaped conductor cross-section, a reduction of the cable cross-section can be obtained without any increase in capacity. This drawing shows for the same cable-section, the use of circular and of sector-shaped conductors having the same sectional areas. This drawing shows that in the case of larger conductors in which the thickness of the insulation is small in comparison with the size of the conductor, the capacity of the sector-shaped conductor will be smaller. Thus, in order to obtain the same capacity, the sectors shown in Figure 1 can be brought together more closely and in this way result in a reduction of the sectional area, the capacity and the copper-section being the same. Furthermore, as the insulation material is, as it were, pressed between plates, the pressure exerted on the cable when laid, is less injurious for the sector-shaped conductor than for the circular one, in which such a pressure can easily bring about approaches, increase in capacity or even contact of the conductors. Finally, owing to a conductor profile of the cable conductors which is adapted to the constructional design, it becomes more symmetrical and stable, as has already been mentioned before.

Figure 2 also shows the substitution of segment-shaped conductors for circular ones having the same cross-section.

Figure 3 shows a constructional example of a cable with four sector-shaped conductors.

The sector-shaped conductors $s$ covered with paper $i$ or with another insulating material, are surrounded by a lead sheath $b^1$. Around the lead sheath are arranged shaped wires which form a pressure protection $d$, and these are in their turn surrounded by a lead sheath $b^2$. The outer lead sheath is covered with impregnated jute or the like *j* and with the armouring steel wire *a*.

According to the invention the conductors having segmentor sector-shaped cross-sections can be manufactioned by conjointly drawing several circular or pre-shaped conductors.

Figure 4:
Figure 5:

Figure 4 diagrammatically shows a sector-shaped conductor made of 3 round wires. Said conductors can also consist of several shaped component conductors which, when assembled give the desired sectional area, as shown, for example, in Figure 5, for a sector-conductor. The edges of the shaped conductor are preferably slightly rounded off, in order to prevent any damage to the insulation which might under certain circumstances be caused.

If required, the invention may be extended to cables containing a greater number of pairs.

I claim:

In a telegraphic or telephonic communication system, that improvement which comprises a submarine cable for low tension currents composed of four communication transmitting conductors each having a sector-shape in cross-section, said conductors being combined relatively to each other to form a core of circular cross-section, insulating envelopes for independently enclosing each conductor, a plurality of segmental members circumferentially fitted together to form a tubular protecting sheath enclosing said conductors and insulating envelopes, and an outer protecting sheath enclosing said segmental members.

WILHELM RIHL.